NUCLEAR MAGNETIC RESONANCE SPECTRUM OF GENTAMICIN $C_1$

NUCLEAR MAGNETIC RESONANCE SPECTRUM OF GENTAMICIN $C_2$

NUCLEAR MAGNETIC RESONANCE SPECTRUM OF GENTAMICIN $C_{1A}$

INVENTORS:
JOSEPH A. MARQUEZ
GERALD H. WAGMAN
DAVID J. COOPER

BY

AGENTS

| United States Patent Office | 3,651,042
Patented Mar. 21, 1972 |
|---|---|

3,651,042
SEPARATION OF THE COMPONENTS OF THE GENTAMICIN COMPLEX
Joseph A. Marquez, Montclair, Gerald H. Wagman, East Brunswick, and David J. Cooper, North Plainfield, N.J., assignors to Schering Corporation, Bloomfield, N.J.
Continuation-in-part of abandoned application Ser. No. 743,740, July 10, 1968. This application Dec. 24, 1968, Ser. No. 786,777
Int. Cl. C07d 7/18
U.S. Cl. 260—210 AB    6 Claims

ABSTRACT OF THE DISCLOSURE

This invention relates to three heretofore unseparated antibiotic substances gentamicin $C_1$, gentamicin $C_2$ and gentamicin $C_{1a}$; to their novel structures and to methods by which they may be separated, one from the other.

---

Figure 1:
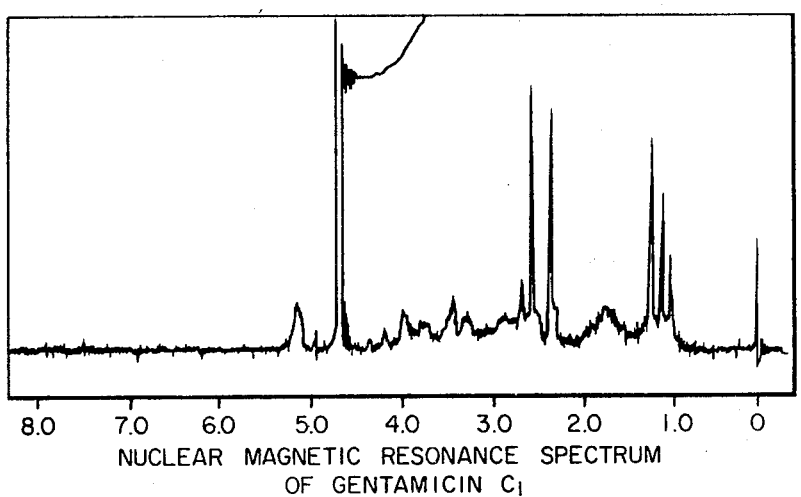

This application is a continuation-in-part of copending application Ser. No. 743,740, filed July 10, 1968 and now abandoned.

This invention relates to novel compositions of matter and to methods for separating and isolating such compositions, one from the other, from the complex mixture in which they are formed. More particularly, this invention relates to basic antibiotics produced by species of the genus Micromonospora and to a facile column chromatographic method for separating said antibiotics one from the other.

In U.S. Pat. 3,091,572, granted May 28, 1963, there is described a new antibiotic identified as gentamycin and methods for the manufacture thereof. Gentamicin (as it is now spelled) is described in the patent as being prepared by the fermentation of certain species of Micromonospora, in particular M. purpurea NRRL 2953, in a nutrient medium, filtering the broth obtained thereby, acidifying the mycelial filter cake and refiltering, adjusting the filtrate to pH 7 and adsorbing the crude gentamicin-containing elaborate onto a cationic exchange resin. The resin is eluted with dilute sulfuric acid and the eluates neutralized and concentrated in vacuo. The crude antibiotic substance, in the form of its sulfate salt, is subsequently obtained by precipitating a concentrated aqueous solution of such sulfate into about 10 volumes of methanol and filtering the precipitated salt. The patent also teaches the further purification of gentamicin by the formation of its dodecylbenzenesulfonic acid salt followed by the conversion of the salt to the free nitrogen base thence to the sulfate salt which is precipitated as previously described.

As is now known, the gentamicin produced by the method of U.S. Pat. 3,091,572 is a mixture of at least three very closely related and structurally similar components which, in the state of their isolation from each other, have heretofore been unknown and unrecognized. Because of the close similarity of these three substances, their separation, one from the other, has not been possible until our discovery thereof utilizing a novel process which is described hereinbelow. The three components comprising the gentamicin complex are designated herein as gentamicin-$C_1$, gentamicin-$C_{1a}$ and gentamicin-$C_2$ which hereinafter will be often referred to as $C_1$, $C_{1a}$ and $C_2$ respectively. The gentamicin complex is found to be comprised of about 25–50%, generally about 40% of $C_1$, about 15–40%, generally about 25% of $C_{1a}$; and about 20–50%, generally about 35% of $C_2$.

$C_1$, $C_2$ and $C_{1a}$ when isolated, one from the other, as described herein, exhibit essentially the same biological activities as the gentamicin starting material and thus individually are useful as antibiotics for all the same indications as gentamicin is presently used. By having the pure component in hand, a tool is provided for more rigorous and exacting pharmacological testing since such evaluation is based upon a single chemical entity of constant composition rather than a mixture, albeit a mixture of closely related substances. As one skilled in the art would expect, when subjected to very exacting pharmacological testing, $C_1$, $C_2$ and $C_{1a}$ do indeed exhibit differences in their biological properties. At least one of the observed differences is sufficiently unexpected to warrant special consideration. Gentamicin $C_1$ exhibits a particular advantage over gentamicin complex with regard to a manifestation which appears to be a common side effect of systematically administered deoxy streptamine-containing antibiotics. In the Weinstein, Wagman and Taber modification of a standard pharmacological test, described in Antimicrobial Agents and Chemotherapy, 1965, pages 227–231, the degree of ataxia in cats brought on by a particular dose of antibiotic indicated significant differences between $C_1$, $C_2$ and $C_{1a}$. The differences observed relate to the impairment of the "righting reflex." Both $C_2$ and $C_{1a}$ are comparable to gentamicin but $C_1$ appears to cause considerably less impairment requiring almost twice the period of high dose administration to induce ataxia as is evidenced with $C_2$ and $C_{1a}$.

The foregoing is especially significant when it is noted that, in addition to being structurally similar, $C_1$, $C_2$ and $C_{1a}$ are quite similar in antibiotic activity as evidenced by their respective potencies in the agar diffusion assay described in U.S. Pat. 3,091,572. When subjected to that assay, $C_1$, $C_2$ and $C_{1a}$ (as sulfates) exhibit potencies of (571), (656) and (626) respectively. Thus, in view of the foregoing, $C_1$ exhibits an enhanced therapeutic index over that of $C_1$ and $C_{1a}$.

The components of gentamicin possess a number of free hydroxyl and amine groups, as shown by Formulae I, II and III below, and generally such compounds tend to form both intra and intermolecular hydrogen bonds. It is not surprising, therefore, that these compounds could be separated only with great difficulty and under rather exacting conditions. Consequently, in order to separate and isolate $C_1$, $C_2$ and $C_{1a}$, one from the other, we have devised a column chromatographic method which provides a means for commercially obtaining the substances in reasonably high yields and yet substantially free of each other.

In one of its process aspects, therefore, the instant invention resides in a commercially feasible column chromatographic separation of $C_1$, $C_{1a}$ and $C_2$ wherein the antibiotics may be separated in a high yield and substantially pure.

In general, we have found that any of those solid adsorbing agents generally used for partition chromatography are useful for the purposes of this invention, particularly those agents whose surfaces are suitable or otherwise facilitate the holding of large quantities of water. Representative of such agents are silica gel, cellulose and diatomaceous earth such as Chromsorb W® (Johns-Manville, New York, N.Y.), and such other solid adsorbing agents having equivalent functional use. Silica gel is a preferred adsorbing agent for many reasons, including the reproducibility of results obtained therewith.

In general, partition chromatographic separations require a high ratio of solid adsorbing agent to the material being separated (chromatographed), often as high as 100 to 1. The instant process tends to be unique in this respect. Silica gel, for example in combination with the novel moving solvent system described below, is capable of separating the components of gentamicin mixtures at loadings up to 20 to 1 (5%). Moreover, at such a loading the column may be operated at unusually high flow rates. For example, a silica gel column of 4.0 kg. may be successfully run at up to 50 ml. per minute. Another unexpected advantage to be derived from the instant process is that the process may be operated semi-continuously, (i.e. the column may be used, stripped, re-loaded and reused). This semi-continuous operation obviates repacking and reconditioning the column after each use. As a direct consequence of the foregoing, a would-be laboratory procedure is transformed into a commercially feasible process.

It has been found that a solvent system comprising a partially chlorinated lower alkane, a lower alcohol and aqueous ammonia in the ratio (by volume) of about 2:1:1 is suitable for effecting the instant separation. The solvent system forms two liquid phases; the lower phase being particularly suited for separating the antibiotics and the upper phase being particularly suited for conditioning solid absorbents other than silica.

As used herein the term "lower alcohol" embraces alcohols having up to four carbon atoms such as methanol, ethanol, propanol, isopropanol, tertiary butanol and the like. The preferred alcohols are those having 1 to 3 carbon atoms with methanol and isopropanol being most preferred.

The term "partially chlorinated lower alkane" is meant to embrace lower alkanes having at least one hydrogen atom remaining, i.e. at least one chlorine atom less than the perchloro analog. A preferred group of such compounds are those having from 1 to 3 carbon atoms, such as chloroform, methylene chloride, m-propyl chloride, dichloro ethane, isopropyl chloride and the like; chloroform being preferred.

The ammonium hydroxide used in the instant process can be varied to contain from about 17% to about 28% ammonia without adversely affecting the separation process. At the lower ammonia concentration the antibiotics move down the column at a slower rate thereby requiring a larger volume of eluent and a longer time. At the higher $NH_3$ concentration the antibiotics move down the column considerably faster, however, in each case a substantially complete separation is effected.

In general, the process aspect of this invention is performed by packing a column with a suitable adsorbent; conditioning the adsorbent by washing with a solvent mixture comprising a lower alcohol, a partially chlorinated lower alkane and 17% ammonium hydroxide in the volume ratio of 1:2:1; adsorbing the antibiotic mixture on the adsorbent; selectively removing the antibiotics from the column by using the aforementioned solvent mixture; and isolating the antibiotics from said solvent mixture.

When silica gel is employed as the adsorbent, it is preferred that the conditioning be carried out using the bottom layer of the above-described solvent mixture. On the other hand, when cellulose or diatomaceous earth is employed, it is preferred that the conditioning be carried out, initially, with the upper layer of the same solvent system followed by replacement with the lower layer.

Usually the adsorbing step is performed by dissolving the antibiotic mixture in from about 1 to about 10 (preferably about 5) volumes of the bottom layer of the solvent mixture and by slowly adding the solution to the top of the column. It is further preferred that the weight of antibiotic mixture be from about 1% to about 5% of the weight of the adsorbent depending upon which adsorbent is used. Alternatively, the antibiotic mixture may be dry mixed with a portion of the adsorbent or dissolved in a solvent, e.g. methanol and adsorbed on a portion of the adsorbent by evaporating the solvent therefrom. The antibiotic-adsorbent mixture is subsequently placed atop a packed column and the separation effected.

The selective removal of $C_1$, $C_2$ and $C_{1a}$ from a 4.0 kg. silica gel column is advantageously carried out in about 24 to 48 hours from the beginning of the desorption operation. If the column has to be packed and conditioned, however, additional time is required. It is generally preferred, especially for large scale operations, to desorb at the fastest rate at which a satisfactory separation is obtained and to combine fractions containing mixtures (overlap) for re-processing.

During the desorption step, the effluent from the column is monitored by subjecting an aliquot of each fraction to thin layer chromatography on silica gel coated glass plates in a solvent system comprising methanol, chloroform and concentrated ammonium hydroxide in the volume ratio of 1:1:1 and spotting various quantities of the solution on the plate. A sample containing approximately equal amounts of $C_1$, $C_2$ and $C_{1a}$ is also spotted and the plate developed in a suitable tank containing the above-described solvent mixture. The plate in subsequently dried, sprayed with ninhydrin and heated at 105° C. for five (5) minutes. In the alternative, the dried plate may be exposed to iodine vapors. By visual comparison, i.e. dark spots against a white background, it is possible to determine which antibiotic is being desorbed and which fractions should be combined.

Alternatively, a sensitive paper chromatographic technique may be employed to monitor the column. The aliquot and the mixture may be spotted on Whatman No. 1 paper. The upper layer of the moving solvent mixture is placed in the bottom of a chromatographic tank. The paper is placed in the tank and the lower layer of the moving solvent mixture is used to develop the paper. In about five (5) hours, the paper is removed, dried, sprayed with ninhydrin and heated at 105° C. as described above. The paper is visually inspected to determine whether the fractions contain antibiotics and, if so, which fractions ought to be combined.

After the removal of the $C_1$ component, the 17% ammonium hydroxide is replaced by concentrated (about 28%) ammonium hydroxide and the column continued until the $C_2$ and the $C_{1a}$ components emerge.

By the utilization of substantially the procedure set forth above, recoveries in excess of 90% may be obtained. The components, obtained in this manner, have the following chemical and physical properties:

TABLE 1
Chemical and physical properties of the gentamicin components

Figure 2:
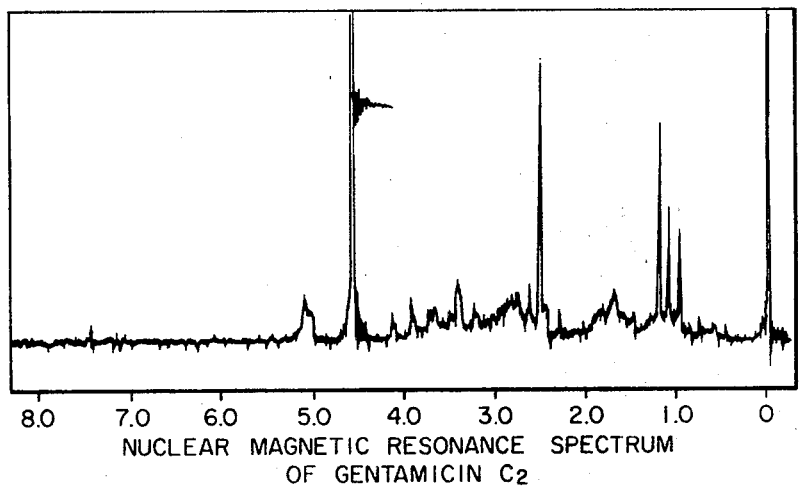
Figure 3:
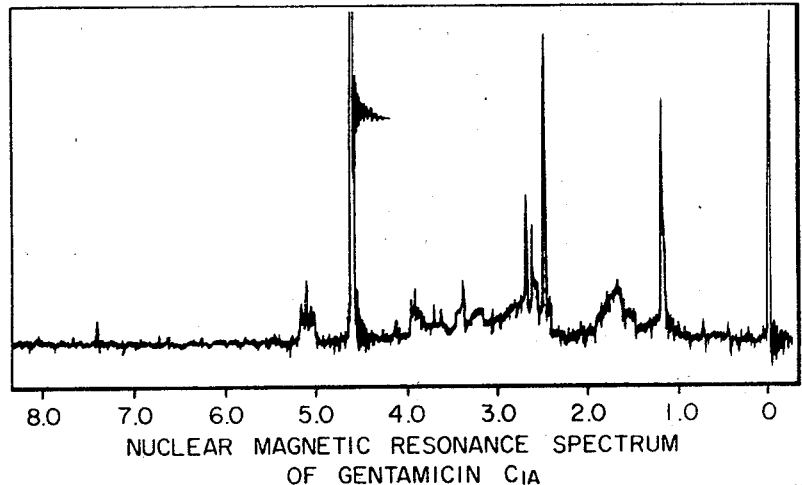

| | Component | | |
|---|---|---|---|
| | $C_1$ | $C_2$ | $C_{1a}$ |
| $[\alpha]_D^{26}$ | +155.0° ($C=0.3H_2O$) | +160.1° ($C=0.6H_2O$) | +165.8° ($C=0.3H_2O$). |
| Molecular formula | $(C_{21}H_{43}N_5O_7)$ | $(C_{20}H_{41}N_5O_7)$ | $(C_{19}H_{39}N_5O_7)$. |
| M.W. as determined by mass spectrometry | 477 | 463 | 449. |
| Nuclear magnetic resonance spectrum | As shown in Fig. 1 | As shown in Fig. 2 | As shown in Fig. 3. |
| Mass spectrum | As shown in Tables II-V | As shown in Tables II-V | As shown in Tables II-V. |

Some of the most commonly reported physical constants are of little value for establishing the identity of gentamicin $C_1$, $C_2$ and $C_{1a}$. For example, the infrared spectra of the individual components do not differ appreciably from each other or from that of the mixture (complex). Further, the components hydrate and solvate with such ease that melting point determinations are of little value for characterization purposes. Even elemental analyses by conventional methods are likely to be inaccurate due to the presence of water or solvent in the sample. Therefore, multiple analyses on carefully dried samples must be resorted to in order to obtain meaningful results.

The nuclear magnetic resonance spectra of gentamicin components $C_1$, $C_2$ and $C_{1a}$ are shown in FIGS. 1, 2 and 3 respectively and were run on a Varian A–60–A spectrometer (Varian Associates, 611 Hansen Way, Palo Alto, Calif.) on about 0.4 ml. of a solution of the respective antibiotics in deuterium oxide ($D_2O$) at about 20 mg./ml. The internal standard used in each instance is 3-(trimethylsilo)-propanesulfonic acid sodium salt.

In Tables II through V below are set forth the mass spectra of the gentamicin components. The columns designated "m/e" represent the mass to charge ratio and columns designated "RI" which means Relative Intensity represent the intensity of the peak at a given mass to charge ratio relative to the most intense peak in the spectrum. In the case of gentamicin $C_1$, there are two peaks of equal intensity; one at the m/e of 48 and another at the m/e of 157. Gentamicin $C_2$ has its most intense peak at the m/e of 143 and gentamicin $C_{1a}$ has its most intense peak at the m/e of 129.

TABLE II.—MASS SPECTRA OF THE GENTAMICINS

| m/e | $C_1$ | $C_2$ | $C_{1a}$ | m/e | $C_1$ | $C_2$ | $C_{1a}$ | m/e | $C_1$ | $C_2$ | $C_{1a}$ | m/e | $C_1$ | $C_2$ | $C_{1a}$ | m/e | $C_1$ | $C_2$ | $C_{1a}$ |
|---|---|---|---|---|---|---|---|---|---|---|---|---|---|---|---|---|---|---|---|
| 50 | | | | 76 | | | | 102 | 11 | 11 | 9 | 128 | 11 | 6 | 9 | 154 | | | |
| 51 | | | | 77 | | | | 103 | | | | 129 | 5 | 3 | 100 | 155 | 5 | | |
| 52 | | | | 78 | | | 3 | 104 | | | | 130 | 13 | 9 | 17 | 156 | 14 | | |
| 53 | 5 | 4 | 3 | 79 | | | 7 | 105 | | | | 131 | | | | 157 | 100 | 2 | 2 |
| 54 | 5 | 5 | 5 | 80 | 6 | 7 | | 106 | | | | 132 | | | | 158 | 20 | 4 | 4 |
| 55 | 20 | 18 | 7 | 81 | 8 | 7 | 5 | 107 | | | | 133 | | | | 159 | 5 | 2 | |
| 56 | 30 | 42 | 55 | 82 | 36 | 43 | 33 | 108 | 5 | 6 | | 134 | | | | 160 | 67 | 81 | 92 |
| 57 | 20 | 20 | 16 | 83 | 13 | 13 | 25 | 109 | 11 | 10 | 8 | 135 | | | | 161 | 10 | 9 | 9 |
| 58 | 100 | 42 | 58 | 84 | 54 | 35 | 36 | 110 | 20 | 17 | 19 | 136 | | | | 162 | 11 | 15 | 19 |
| 59 | 37 | 18 | 17 | 85 | 19 | 13 | 12 | 111 | 16 | 7 | 11 | 137 | | | | 163 | | | |
| 60 | 13 | 7 | 8 | 86 | 40 | 29 | 26 | 112 | 16 | 12 | 17 | 138 | | | | 164 | | | |
| 61 | | | | 87 | 19 | 15 | 15 | 113 | 9 | 8 | 7 | 139 | 32 | | | 165 | | | |
| 62 | | | | 88 | 9 | 7 | 7 | 114 | 32 | 13 | 10 | 140 | 11 | | | 166 | | | |
| 63 | | | | 89 | | | | 115 | 3 | | | 141 | 6 | 2 | | 167 | | | |
| 64 | | | | 90 | | | | 116 | | | | 142 | 14 | 15 | 11 | 168 | | | |
| 65 | | | | 91 | | | | 117 | | | | 143 | 5 | 100 | 5 | 169 | | | |
| 66 | 6 | | | 92 | 3 | 3 | 3 | 118 | 69 | 56 | 52 | 144 | 5 | 12 | 4 | 170 | | | |
| 67 | 32 | 6 | 7 | 93 | 3 | 2 | 2 | 119 | 5 | 4 | 4 | 145 | 20 | 21 | 31 | 171 | | | |
| 68 | | 31 | 30 | 94 | 9 | 7 | 11 | 120 | | | | 146 | 6 | 6 | 7 | 172 | 3 | | |
| 69 | 11 | 11 | 7 | 95 | 6 | 5 | 5 | 121 | | | | 147 | | | | 173 | 16 | 8 | 9 |
| 70 | 40 | 31 | 15 | 96 | 22 | 13 | 5 | 122 | | | | 148 | | | | 174 | 3 | | |
| 71 | 32 | 25 | 21 | 97 | 24 | 30 | 7 | 123 | 5 | | | 149 | | | | 175 | 6 | | |
| 72 | 49 | 49 | 37 | 98 | 46 | 21 | 9 | 124 | 5 | 3 | | 150 | | | | 176 | 3 | | |
| 73 | 44 | 39 | 37 | 99 | 11 | 6 | 5 | 125 | | 19 | 3 | 151 | | | | 177 | | | |
| 74 | 19 | 16 | 16 | 100 | 36 | 29 | 27 | 126 | 35 | 30 | 11 | 152 | | | | 178 | 10 | 4 | 4 |
| 75 | | | | 101 | 11 | 9 | 9 | 127 | 11 | 8 | 6 | 153 | | | | 179 | | | |

TABLE III.—MASS SPECTRA OF THE GENTAMICINS

| m/e | $C_1$ | $C_2$ | $C_{1a}$ | m/e | $C_1$ | $C_2$ | $C_{1a}$ | m/e | $C_1$ | $C_2$ | $C_{1a}$ | m/e | $C_1$ | $C_2$ | $C_{1a}$ | m/e | $C_1$ | $C_2$ | $C_{1a}$ |
|---|---|---|---|---|---|---|---|---|---|---|---|---|---|---|---|---|---|---|---|
| 180 | | | | 206 | | | | 232 | | | | 258 | | | 4 | 284 | 3 | 1 | |
| 181 | | | | 207 | | | | 233 | | 2 | 2 | 259 | | | | 285 | 5 | 2 | |
| 182 | | | | 208 | | | | 234 | | | | 260 | | | | 286 | 22 | 3 | |
| 183 | 3 | | | 209 | 3 | | | 235 | | | | 261 | | | | 287 | 6 | 3 | |
| 184 | | | | 210 | | | | 236 | | | | 262 | | | | 288 | 3 | 4 | |
| 185 | | | | 211 | | | | 237 | | | | 263 | | | | 289 | 13 | 4 | 2 |
| 186 | | | | 212 | | | | 238 | | | | 264 | | | | 290 | 3 | | |
| 187 | 3 | 3 | | 213 | | | | 239 | | | | 265 | | | | 291 | | | 2 |
| 188 | 3 | | | 214 | | | | 240 | | | | 266 | | | | 292 | | | |
| 189 | | | | 215 | | | | 241 | | | | 267 | | | | 293 | | | |
| 190 | | | | 216 | 3 | | | 242 | 5 | 6 | 4 | 268 | 5 | | | 294 | | | |
| 191 | 17 | 20 | 24 | 217 | | | | 243 | | 1 | | 269 | | | | 295 | | | |
| 192 | 3 | | | 218 | | | | 244 | | | | 270 | | 1 | | 296 | | | |
| 193 | | | | 219 | 3 | 2 | 2 | 245 | 11 | 2 | | 271 | | 1 | | 297 | | | |
| 194 | | | | 220 | | | | 246 | 5 | 5 | 5 | 272 | | 5 | 2 | 298 | | | |
| 195 | | | | 221 | | | | 247 | 3 | | | 273 | 24 | 3 | 2 | 299 | | | |
| 196 | | | | 222 | | | | 248 | | | | 274 | 3 | | 2 | 300 | | | 2 |
| 197 | | | | 223 | | | | 249 | | | | 275 | | | | 301 | 3 | | |
| 198 | | | | 224 | | | | 250 | | | | 276 | | | | 302 | 6 | 1 | 2 |
| 199 | | | | 225 | | | | 251 | | | | 277 | | | | 303 | 5 | 1 | |
| 200 | | | | 226 | | | | 252 | | | | 278 | | | | 304 | 11 | 20 | 22 |
| 201 | 3 | 1 | | 227 | 10 | | | 253 | | | | 279 | | | | 305 | 6 | 7 | 5 |
| 202 | | 1 | | 228 | 3 | | | 254 | | | | 280 | | | | 306 | | 1 | |
| 203 | | | | 229 | | | | 255 | | 1 | | 281 | | | | 307 | | | |
| 204 | | 4 | 7 | 230 | | | | 256 | | | | 282 | | | | 308 | | | |
| 205 | 3 | 5 | 5 | 231 | | | | 257 | | | | 283 | | | | 309 | | | |

TABLE IV.—MASS SPECTRA OF THE GENTAMICINS

| m/e | II C₁ | III C₂ | IV C₁ₐ | m/e | II C₁ | III C₂ | IV C₁ₐ | m/e | II C₁ | III C₂ | IV C₁ₐ | m/e | II C₁ | III C₂ | IV C₁ₐ | m/e | II C₁ | III C₂ | IV C₁ₐ |
|---|---|---|---|---|---|---|---|---|---|---|---|---|---|---|---|---|---|---|---|
| 310 | | | | 336 | | | | 362 | | | | 388 | | 1 | | 414 | | | |
| 311 | | | | 337 | | | | 363 | | | | 389 | | | | 415 | | | |
| 312 | | | | 338 | | | | 364 | | | | 390 | | | | 416 | | | |
| 313 | | | | 339 | | | | 365 | | | | 391 | | | | 417 | | | |
| 314 | | | | 340 | | | | 366 | | | | 392 | | | | 418 | | | |
| 315 | | | | 341 | | | | 367 | | | | 393 | | | | 419 | | | |
| 316 | | 2 | | 342 | | | | 368 | | | | 394 | | | | 420 | | 10 | 1 |
| 317 | | | | 343 | | | | 369 | | | | 395 | | | | 421 | | 2 | |
| 318 | | | | 344 | | | | 370 | | | | 396 | | | | 422 | | | |
| 319 | 3 | | 5 | 345 | | | | 371 | | | | 397 | | | | 423 | | | |
| 320 | | | | 346 | | 5 | | 372 | | | | 398 | | | | 424 | | | |
| 321 | | | | 347 | | 14 | 1 | 373 | | | 1 | 399 | | | | 425 | | | |
| 322 | 11 | 28 | 22 | 348 | | 3 | | 374 | | | | 400 | | | | 426 | | | |
| 323 | | 5 | 4 | 349 | | | | 375 | | | | 401 | | 1 | 1 | 427 | | | |
| 324 | | 1 | | 350 | 3 | 6 | 4 | 376 | | | | 402 | 2 | | | 428 | | | |
| 325 | | | | 351 | | 1 | 1 | 377 | | 1 | | 403 | 2 | | | 429 | | | |
| 326 | | | | 352 | | | | 378 | | | | 404 | | | | 430 | | | |
| 327 | | | | 353 | | | | 379 | | | | 405 | | | | 431 | | | |
| 328 | 6 | | 5 | 354 | | | | 380 | | | | 406 | | | | 432 | | | 2 |
| 329 | | | 2 | 355 | | | | 381 | | | | 407 | | | | 433 | | | |
| 330 | 6 | | | 356 | | | | 382 | | | | 408 | | | | 434 | | | |
| 331 | | | | 357 | | | | 383 | | | | 409 | | | | 435 | | | |
| 332 | | 2 | | 358 | | | | 384 | | | | 410 | | | | 436 | | | |
| 333 | | 5 | | 359 | | | | 385 | | | | 411 | | | | 437 | | | |
| 334 | | 1 | | 360 | | 6 | | 386 | | | | 412 | | | | 438 | | | |
| 335 | | | | 361 | | | | 387 | | | | 413 | | | | 439 | | | |

TABLE V.—MASS SPECTRA OF THE GENTAMICINS

| m/e | C₁ | C₂ | C₁ₐ | m/e | C₁ | C₂ | C₁ₐ |
|---|---|---|---|---|---|---|---|
| 440 | | | | 466 | | | |
| 441 | | | | 467 | | | |
| 442 | | | | 468 | | | |
| 443 | | | | 469 | | | |
| 444 | | | | 470 | | | |
| 445 | | | | 471 | | | |
| 446 | | 1 | | 472 | | | |
| 447 | | | | 473 | | | |
| 448 | | | | 474 | | | |
| 449 | | | 1 | 475 | | | |
| 450 | | | 1 | 476 | | | |
| 451 | | | | 477 | | 2 | |
| 452 | | | | 478 | | 2 | |
| 453 | | | | 479 | | | |
| 454 | | | | 480 | | | |
| 455 | | | | 481 | | | |
| 456 | | | | 482 | | | |
| 457 | | | | 483 | | | |
| 458 | | | | 484 | | | |
| 459 | | | | 485 | | | |
| 460 | 2 | | | 486 | | | |
| 461 | | | | 487 | | | |
| 462 | | | | 488 | | | |
| 463 | | 1 | | 489 | | | |
| 464 | | 1 | | 490 | | | |
| 465 | | | | | | | |

Based largely on the chemical and physical data set forth above, it is believed that the components of the gentamicin complex have the following gross structures with no stereochemical configuration being assigned; said formulae depict gentamicin C₁, gentamicin C₁ₐ and gentamicin C₂, respectively.

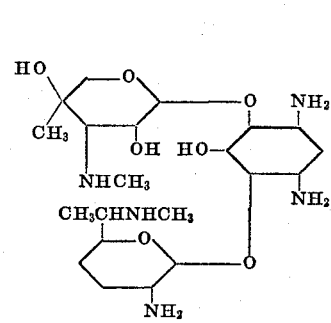

I

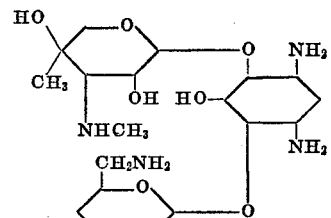

II

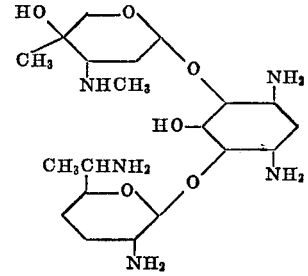

III

The following examples are presented to illustrate the instant invention but without limiting the scope thereof:

EXAMPLE 1

Prepare a chromatographic column by packing Whatman No. 1 cellulose powder into a column having an I.D. of 2.4 cm. and a height of 30 cm. Pass the upper layer of a solvent mixture comprising methanol: chloroform: 17% ammonium hydroxide (1:2:1 v./v.) through the column until a yellow band of impurities is desorbed. Allow the column to drain. Mix 200 mg. of gentamicin sulfate (equivalent to 129 mg. of base) with 2.0 g. of cellulose powder and pack the mixture atop the column. Elute the column with the lower layer of the above-described solvent mixture at the rate of 2.0 ml./minute collecting 16.0 ml. fractions preferably on a mechanical fraction collector. Monitor the separation by spotting an aliquot of each fraction on Whatman No. 1 paper and by spotting a mixture containing about equal quantities of C₁, C₂ and C₁ₐ. Place the paper in a tank containing the upper layer of the above-described solvent mixture and use the lower layer to develop the papergram. Permit the paper to develop for about 5 hours followed by drying and spraying with ninhydrin. Combine the fractions containing like antibiotics and obtain thereby 121.5 mgs. (94%) of product having the following distribution:

EXAMPLE 2

| Antibiotic | Fractions | Weight, mg. | Assay, μg/mg. |
|---|---|---|---|
| $C_1$ (base) | 12–19 | 58.2 | 850 |
| $C_2$ (base) | 23–33 | 50.8 | 1,025 |
| $C_{1a}$ (base) | 38–49 | 12.5 | 805 |
| Total | | 121.5 | |

EXAMPLE 2

Pack a (4" I.D. x 6' L.) chromatographic column with 4.0 kg. of silica gel suspended in about 12.0 liters of the bottom layer of a solvent mixture consisting of chloroform, isopropanol and 17% ammonium hydroxide (2:1:1 by volume). Convert 150 g. of gentamicin complex sulfate to the free base by treating a suspension thereof in chloroform (10–15 ml./g.) with ammonia gas for about 1½ hours with vigorous agitation. Remove the ammonium sulfate by filtration preferably through a sintered glass funnel under reduced pressure and concentrate the chloroform solution of the free base to a residue in vacuo below 50° C. Redissolve the residue in about 3 ml. of chloroform per gram of antibiotic (based on 150 g.) and add the solution to the column. Elute the column, with the solvent mixture described above, taking 400 to 450 ml. fractions at a rate of from about 40 to 45 ml. per minute. Monitor the effluent by thin layer chromatography on silica gel plates (solvent $CHCl_3:CH_3OH$: Conc. $NH_4OH$–1:1:1). Replace the 17% ammonium hydroxide with concentrated (28%) ammonium hydroxide when the $C_1$ component is completely removed. Continue the column until the $C_2$ and the $C_{1a}$ components are removed, the entire separation requiring about 250–350 fractions. Combine the fractions containing like antibiotics and evaporate them to a residue. Weigh the residue and dissolve it in water. Adjust the pH of the solution to 4.0–4.5 with dilute sulfuric acid and treat the solution with decolorizing carbon. Concentrate the acidic solution to about 4 ml./g. of residue and pour slowly into 10 volumes of vigorously stirred methanol. Collect the antibiotic sulfate by filtration and dry in vacuo to constant weight and obtain thereby 123.3 g. (82.3%) of product as follows:

| Antibiotic | Fractions | Weight, g. | Assay, μg./mg. |
|---|---|---|---|
| $C_1$ (sulfate) | 34–60 | 57.0 | 514 |
| $C_2$ (sulfate) | 91–135 | 30.8 | 713 |
| $C_{1a}$ (sulfate) | 170–317 | 35.5 | 607 |
| Total | | 123.3 | |

We claim:

1. A process for separating the $C_1$, $C_{1a}$ and $C_2$ components of gentamicin which comprises chromatographing a mixture of said components on a solid adsorbing agent using a liquid moving phase consisting of the bottom layer of a solvent system comprising a lower alkanol having 1 to 4 carbon atoms, a partially chlorinated lower alkane having 1 to 3 carbon atoms and ammonium hydroxide in the volume ratio of about 1:2:1, wherein the ammonium hydroxide has a concentration of from about 17% to 28% ammonia, collecting said components individually and isolating the components from said liquid moving phase.

2. The process of claim 1 wherein the solid adsorbing agent is silica gel.

3. The process of claim 2 wherein the lower alcohol is isopropanol and the partially chlorinated lower alkane is chloroform.

4. The process of claim 3 wherein gentamicin is subjected to partition chromatography on silica gel using the liquid moving phase consisting of the bottom layer of a solvent system which comprises by volume a 1:2:1 mixture of isopropanol, chloroform and ammonium hydroxide containing by weight from about 17 to about 28% of ammonia and isolating the gentamicin from said liquid moving phase.

5. Gentamicin $C_1$, a solid composition of matter having
   (a) a molecular weight of 477 as determined by mass spectrometry.
   (b) the empirical formula $C_{21}H_{43}N_5O_7$;
   (c) a specific optical rotation as measured by the D line of sodium at 26° C. of +155.0° in water at 0.3% concentration;
   (d) a nuclear magnetic resonance spectrum substantially as shown in FIG. 1;
   (e) a mass spectrum substantially as shown in Tables II, III and IV;
   (f) substantially the following structural formula:

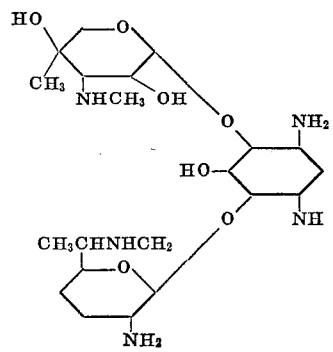

and being substantially free from co-produced components $C_{1a}$ and $C_2$.

6. Gentamicin $C_{1a}$, a solid composition of matter, said composition having:
   (a) a molecular weight of 444 as determined by mass spectrometry;
   (b) the empirical formula $C_{18}H_{39}N_5O_7$;
   (c) a specific optical rotation as measured by the D line of sodium at 26° C. of +165.8° in water at 0.3% concentration;
   (d) a nuclear magnetic resonance spectrum substantially as shown in FIG. 3;
   (e) a mass spectrum substantially as shown in Tables II, III and IV;

(f) substantially the following structural formula:

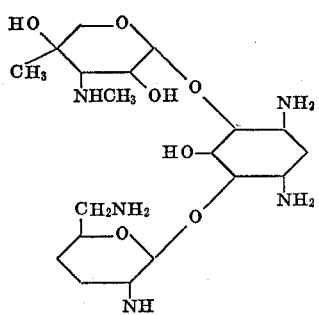

and being substantially free from co-produced components $C_1$ and $C_2$.

References Cited

UNITED STATES PATENTS 3,091,572  5/1963  Luedemann et al. _____ 424—118

OTHER REFERENCES

Wagman et al.: Applied Microbiology, April 1968, vol. 16 (4), pp. 624–7.

Wagman et al.: J. Chromatog., 34 (Apr. 9, 1968), pp. 210–15.

T. Ikekawa et al.: Jour. of Antibiotics, Ser. A, vol. 16 (1) (January 1963), pp. 56–57.

Dissertation Abstracts, vol. 25 (1964), p. 2207.

Weinstein et al.: Journal of Bacteriology, vol. 94, No. 3 (September 1967), pp. 789–790.

Weinstein et al.: Antimicrobial Agents and Chemotherapy, 1963, 1964, pp. 1–7.

Rosselet et al.: Antimicrobial Agents and Chemotherapy, 1963, 1964, pp. 13–16.

NORMA S. MILESTONE, Primary Examiner